Jan. 8, 1963     H. ROSENBERG ETAL     3,072,241
APPARATUS FOR DISPLACING A LONGITUDINAL MINING CONVEYOR
Filed Sept. 7, 1960     2 Sheets-Sheet 2
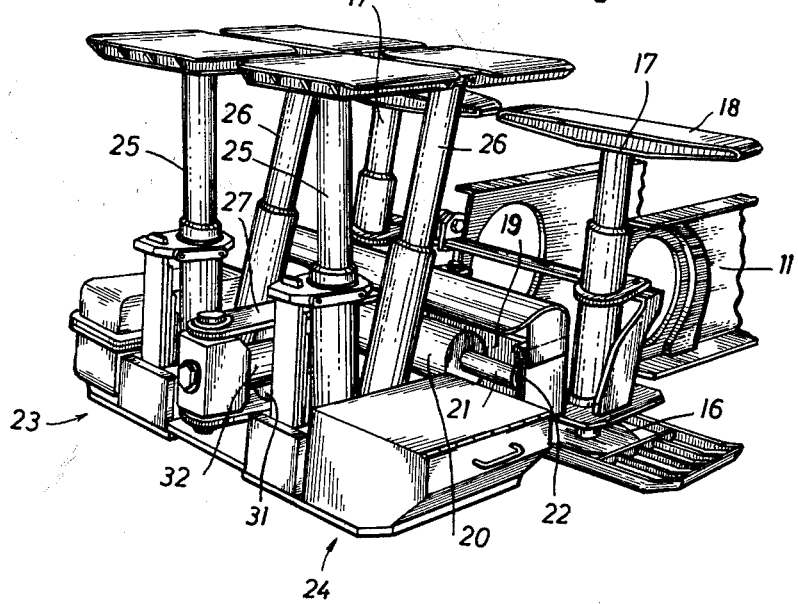
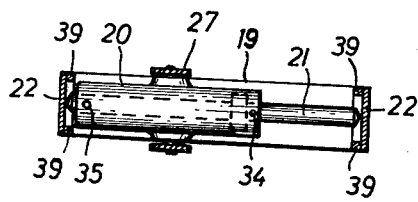
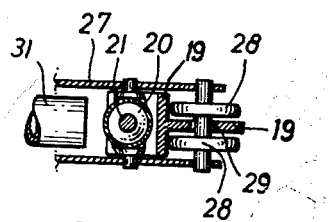
INVENTORS:
HARRY ROSENBERG + HORST LINKE
BY
ATTORNEYS 3,072,241
APPARATUS FOR DISPLACING A LONGITUDINAL MINING CONVEYOR
Harry Rosenberg and Horst Linke, Lunen, Germany, assignors to Gewerkschaft Eisenhütte Westfalia, Wethmar, near Lunen, Germany, a corporation of Germany
Filed Sept. 7, 1960, Ser. No. 54,389
Claims priority, application Germany Sept. 9, 1959
6 Claims. (Cl. 198—126)

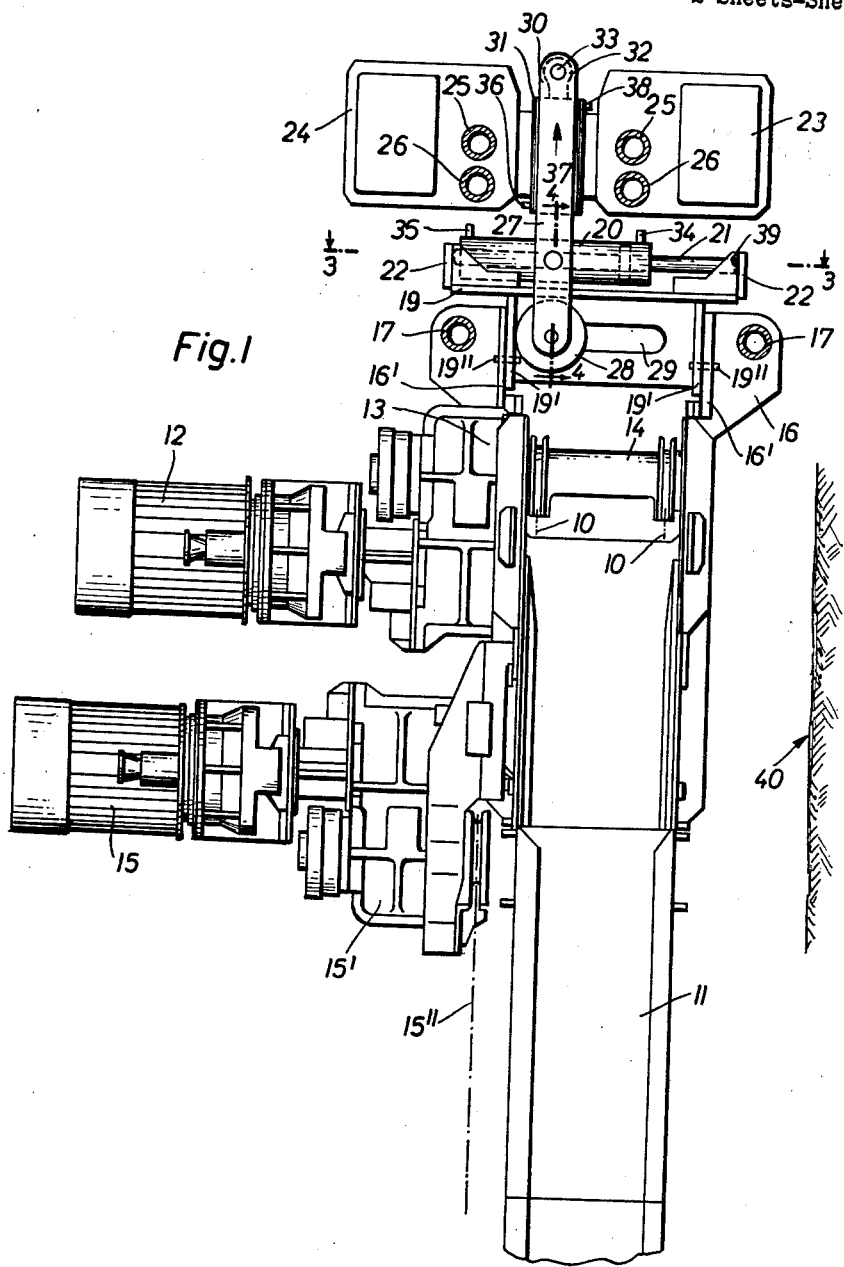

The present invention relates to an apparatus for displacing a longitudinal mining conveyor, and more particularly to such apparatus attached to the end of a conveyor for displacing the conveyor transversely and longitudinally.

Generally, in the mining of coal and other mineral material, a planing device is often used to extract coal from the mine face. In this regard, the planing device is moved against the coal face whereby a layer of coil is scraped from the adjacent mine wall. In order to conveniently remove the extracted coal from the site of mining operations, a longitudinal conveyor is provided adjacent the mine face along the path of travel of the planing device.

Accordingly, as the planing device extracts the coal, by reason of the positioning of the conveyor, the coal falls thereon and is conducted from the site of mining operations.

In particular, double chain scraper conveyors are used wherein a pair of parallel endless chains are provided mounted for movement in the same direction so as to carry the coal by means of the scraper bars along the surface of the conveyor to a distant point of recovery. The planing device may be conveniently supported in a track disposed along the conveyor on the side adjacent the mine face being extracted.

As each layer of coal is scraped from the mine face, the planing device must be moved forward in transverse direction so that it may engage the next layer of coal. In the same way, the conveyor must be advanced to accommodate the newly extracted coal.

Various means have been used to accomplish the advancing moment of the conveyor such as by employing releasing beams which are positioned transversally with respect to the conveyor and which conduct the conveyor forward. The conveyor is slidably mounted on these beams so that the transverse movement may be executed with ease. Moreover, constructions are known in which crane carriages are positioned at the ends of the conveyor which are connected thereto by displaceable means. The known releasing means have the disadvantage that the longitudinal beam employed projects laterally far beyond the width of the conveyor and accordingly necessitates long and wide stalls for the mining operation. Furthermore, in this same connection, an unduly large amount of space is required on the side of the conveyor adjacent the mine face being extracted. Such conventional means also require a considerable expenditure of energy, since these means are often manually operated. This is especially true since the conveyor must be separately released as soon as the beam itself must be advanced in order to advance, in turn, the conveyor.

Proposals have already been made to equip the conveyor with automatically advancing mining prop units or mining frames which coact in pairs to achieve the advancing of the conveyor. In the conventional manner, one frame is secured against movement and is used as support for executing the movement of the other frame and the conveyor, and thereafter the one frame is released and the other secured to continue the next advancing movement of the conveyor. Nevertheless, the conveyor and mining frame arrangement was not entirely satisfactory since the advancement of the conveyor did not take place in the desired manner but instead the conveyor was often displaced out of its normal path, either at an angle to its transverse direction of movement or to the longitudinal direction of the mine face. This necessitated stoppage of the mining operation from time to time in order to realign the conveyor and maintain it in the correct position.

Further attempts were made to develop the mining frame such that the step-wise advancing could be carried out not only in one but two direction. Thus, a piston cylinder arrangement was provided which permitted the two frames to advance in step-wise manner in a direction parallel with respect to one another as well as in a direction transverse or lateral with respect to one another. Thus, the conveyor could be displaced not only in transverse direction with respect to the longitudinal path of the mine face being worked but also in longitudinal direction.

A recent development rendered possible in a simple and inexpensive manner the uniting of a mining frame arrangement with the conveyor end such that practically no space beyond the customary width of the conveyor is required. In order to adjust to the local variations in the floor and ceiling of a mine tunnel, the two mining frames had to be connected to one another in a manner different from the comparatively rigid manner in which the usual mining frames are connected.

In order to accomplish a desired connection, the conveyor end itself is provided with hydraulic pit props or mining props vertically positioned with respect to the conveyor. These pit props are attached to a swinging frame which is pivotally attached to the end of the conveyor. By arranging the axis of pivot in a direction transverse to that of the conveyor, in a horizontal direction, the pit props may advantageously be used where the mine floor is uneven. A separate mining frame in this instance is attached to the conveyor end by means of a flexible strap of metal. This mining frame is similarly provided with pit props. The separate mining frame may, therefore, be secured against movement by extending the pit props into engagement with the floor and ceiling of the mine tunnel, and by means of a hydraulic cylinder and piston arrangement, the pivoting frame and conveyor end attached thereto may be advanced in longitudinal direction. By providing the pivoting frame, attached to the conveyor end with a transverse double acting piston cylinder arrangement, in the same way, the conveyor may be moved in transverse direction.

It has been found, however, that the transverse piston cylinder arrangement required unduly wide dimensions on the side of the conveyor adjacent the mine face which entailed a certain space requirement. Moreover, the mining frame units, including the separate unit connected to the pivoted unit on the conveyor end, as well as the piston cylinder arrangements, were not sufficient to accommodate the various uneven portions of the floor and ceiling of mining tunnels in an efficient manner.

It is an object of the present invention to overcome the foregoing drawbacks and to provide an apparatus for displacing a longitudinal mining conveyor in both longitudinal and transverse directions, which apparatus efficiently accommodates itself to the changing levels of mine floor and ceiling as the case may be.

Other and further objects of the invention will become apparent from a study of the within specification and accompanying drawings, in which FIGURE 1 represents a schematic plan view, partially in section, of an end of a longitudinal mining conveyor, including the apparatus of the invention, FIGURE 2 is a perspective view of the conveyor end with the apparatus of the invention, FIGURE 3 is a cross-section taken along line 3 in FIG. 1, FIGURE 4 is a cross-section taken along line 4 in FIG. 1.

In accordance with the present invention, it has been found that an apparatus for displacing a longitudinal mining conveyor may be provided which comprises a first member having longitudinal displacing means and a second member having transverse displacing means. Connecting means interconnect said first member with said second member for longitudinally displacing the first and second members with respect to one another by said longitudinal displacing means and for transversely displacing the first and second members with respect to one another by said transverse displacing means. Pit props or other means for releasably securing each of said first and second members from displacement when the other member is to be displaced are suitably provided. The second member is suitably secured to a longitudinal mining conveyor for simultaneous displacement of the conveyor with the second member.

Specifically, in accordance with the invention, the transverse displacing means are mounted on the second member for both vertical and horizontal movement with respect to the second member yet the transverse displacing means are secured against transverse and longitudinal movement with respect to the second member.

Preferably, the transverse displacing means includes a double-acting piston mounted on a rod operably disposed within a cylinder such that the ends of the rod extend through the corresponding ends of the cylinder. Either the rod or cylinder is mounted to the second member while the other is connected to the connecting means interconnecting the first and second members. The longitudinal displacing means preferably includes coacting piston and cylinder means wherein either the piston or cylinder means is mounted on the first member and the other is connected to the connecting means which interconnects the two members.

The first member is secured from transverse movement with respect to the connecting means yet is mounted for longitudinal movement with respect thereto. The second member, on the other hand, is secured from longitudinal movement with respect to the connecting means yet is mounted for transverse movement with respect thereto.

Advantageously, the second member is pivotally connected to one end of a longitudinal mining conveyor about a horizontal axis of pivot extending in transverse direction. By providing pit props on the end of the conveyor, as well as on the first member, the first member, by means of its pit props, and the second member, by means of the pit props provided at the end of the conveyor, may be secured against the mine ceiling and mine floor to prevent the undesired movement of the particular member.

In accordance with the invention, in order to freely accommodate variations in the level of the mine floor and mine ceiling, the second member is pivotally connected to one end of the conveyor. In this manner, the second member may adjust to a different floor level from that in the vicinity of the conveyor. Moreover, the connecting means between the first and second members may take the form of a flexible metal strap so that the desired displacement of the members may be carried out even where the level of the mine floor is different for these members.

Preferably, the second member is provided with an intermediate transverse slot defined therethrough as well as lateral retaining means defined in two parallel vertical planes extending in longitudinal direction. The ends of the piston rod of the second member are freely positioned between the retaining means for swiveling vertically and horizontally in longitudinal direction. The double acting piston rod, however, is retained from transverse movement with respect to the second member. In this connection, the double-acting cylinder therefor is itself connected along its intermediate portion with the flexible strap employed as connecting means inter-connecting the first and second members.

The connecting means or strap is attached to the second member at one end by means of a pin inserted in the slot defined through the second member. The other end of the connecting means or strap is connected to the longitudinally disposed piston rod of the piston cylinder arrangement provided on the first member. The strap is passed between guide means on the first member extending in longitudinal direction in order to maintain the strap and the first member in fixed relation with respect to one another yet permitting the strap to be longitudinally displaced with respect to the first member by means of the longitudinal piston cylinder arrangement.

In operation, by extending or retracting the longitudinal piston of the first member, the second member and, in turn, the conveyor will be longitudinally displaced since the first member is secured against movement by means of the pit props. On the other hand, by securing the second member and conveyor by means of the pit props provided therefor, upon releasing the pit props of the first member, the first member will be displaced in longitudinal direction. Thus, for displacing one member with respect to the other, the member to be displaced is released from its secured position by retracting the pit props from the mine ceiling and floor while the other member is secured by extending its pit props into abutting engagement with the mine ceiling and floor.

Concerning the transverse movement of the conveyor with respect to the mine face being worked, upon securing the pit props of the first member and releasing the pit props for the second member and conveyor, pressure fluid is passed to the transverse double acting piston cylinder arrangement whereby the piston rod urges against the retaining means so as to displace the second member and conveyor toward the mine face. Since the connecting means or strap is secured to the second member by means of a slot construction, the desired movement will be executed efficiently. After this movement has taken place, the reverse actuation may be carried out whereby the pit props of the second member are secured and the pit props of the first member released so that the first member will be urged toward the mine face as desired due to the transverse movement of the cylinder attached to the connecting means. In this instance, due to the provision for a slot in the second member, the strap will readily pass along the slot to the other end thereof.

It will be appreciated from the foregoing that the double-acting transverse piston rod is prevented from moving only in transverse direction while the same may freely move in its cylinder in all directions and levels of displacement with respect to the conveyor about the point of connection of the cylinder with the flexible strap intermediate its end portions.

Referring to the drawings, a double chain scraper conveyor 11, provided with the apparatus of the invention is disposed adjacent and parallel to the longitudinal mine face 40 to be extracted by means of a planing device of conventional construction. A pair of endless chains 10 are mounted for movement at either end on a chain sprocket drum 14 driven by motor 12 via the transmission 13. The coal planing device (not shown) is driven by means of endless chain 15" powered by motor 15 and transmission 15'.

The end of conveyor 11 is extended to form a base plate 16 carrying a pair of pit props 17. The pit props 17 may be provided with an overhead transverse support bar to form a mining frame if desired. The base plate 16 is provided intermediate its end portions with a pair of vertically disposed longitudinal extensions 16' which pivotally mount slot plate 19 by means of the vertically disposed longitudinal extensions 19' connected at their lower ends with slot plate 19. Pivots 19'' are used as the pivotal connection between each extension 16' and the corresponding extension 19'. In this manner slot plate 19 may be pivoted about a transverse axis of pivot so that slot plate 19 may be displayed in a vertical plane passing in the longitudinal direction of conveyor 11. The end of slot plate 19 remote from conveyor 11 is provided with a transverse extension having retaining plates 22 extending in a vertical plane in longitudinal direction. Double acting piston 21 is transversely disposed between retaining plates 22 such that there is a slight clearance between the ends of piston 21 and the corresponding retaining plates 22. Piston 21 is arranged for movement in both directions within cylinder 20 such that the ends of piston 21 extend through the ends of cylinder 20.

The other mining frame member 23 is disposed adjacent the end of conveyor 11 and immediately ahead of slot plate 19. Member 23 is provided with lateral sliding rails 24 as well as pit props 25 and 26 which may be provided with overhead bars to form a pair of adjacent transversely extending pit prop frames. Mining frame member 23 is provided with a longitudinally extending cylinder 31 intermediate its end portions having a piston rod 32 longitudinally movable back and forth therein.

Flexible strap 27 is connected at one end to piston rod 32 by means of bolt 33 and at the other end to slot plate 19 by means of a vertically extending pin passing through roller 28 and slot 29 defined through slot plate 19. Cylinder 20 is intermediately connected to strap 27 at a point adjacent the lateral retaining plates 22.

It will be appreciated that two rollers 28 are provided one above and one below the slot 29 of slot plate 19, these rollers being interconnected by a vertically extending pin or axle rod connected at its upper end to strap 27. In this manner strap 27 may be moved in transverse direction with respect to slot plate 19 along the extent of slot 29 with rollers 28 engaging the forward vertical wall inter-connecting retaining plates 22. The efficient, low friction operation of the displacement means of the invention, will, therefore, be easily carried out.

The pit props 17, 25, and 26 are suitably provided as adjustable hydraulic pit props extending in vertical direction and capable of engaging the mine ceiling and mine floor when placed in extended position. If desired, the pit props 26 of the mining frame 23 may be positioned at their upper ends inclined toward conveyor 11 so that the same may act as bracing props to prevent any undesired displacement of frame member 23 in consequence of the various forces acting thereupon. Pit props 17 of the other mining frame member constructed at the end of conveyor 11 may also be provided as bracing props extending in an inclined direction at their upper ends in a direction toward mining frame member 23. Naturally, the pit props shown may all extend in vertical direction and additional supporting members provided to secure and brace the respective mining frame members from undesired displacement.

Due to the freely suspended construction of piston 21 about the point of connection between strap 27 and cylinder 20, strap 27 may rotate somewhat about its longitudinal axis as a result of the roller 28 and slot 29 mounting at one end and the bolt 33 mounting at the other end. Thus, piston 21 may swivel in a vertical plane extending in transverse direction about the point of connection of cylinder 20 to strap 27. Moreover, piston 21 may swivel in a horizontal plane about this point of connection. However, due to the provision for maintaining plates 22, even though the ends of piston 21 are not in fixed contact with the corresponding retaining plates 22, these retaining plates 22 prevent the axial or transverse displacement of piston 21 with respect to slot plate 19. Strap 27 is capable of longitudinal movement in the direction of arrow 37 and in the reverse direction due to the connection by bolt 33 with piston 32. Thus, strap 27 may be longitudinally displaced by piston 32 with respect to mining frame member 23 and longitudinal cylinder 31.

When uneven mining floors and ceilings are encountered, the apparatus of the invention is suitably accommodated thereto in consequence of the pivotal connection of slot plate 19 to base plate 16 via pivots 19'' and the arrangement of rollers 28 and slot 29, as well as the flexible construction of strap 27, the freely swiveling mounting of piston 21, and the point of connection of strap 27 to piston 32 at bolt 33. Of course, it will be appreciated that piston 21 is prevented from completely disengaging from retaining plates 22 by means of rim 39. Suitably, the respective ends of piston 21 may be in accordance with one embodiment of the invention, retained in cup-like elements permitting limited vertical and horizontal swiveling yet preventing transverse or axial displacement and complete disengagement with retaining plates 22.

In operation, where the apparatus is disposed in the position shown in FIGURE 1 of the drawings, the pit props 17 are secured to the mine ceiling and mine floor to prevent the displacement of base plate 16 and accordingly the end of conveyor 11. On the other hand, pit props 26 and 25 are released from engagement with the mine ceiling and mine floor. Pit props 17, 25, and 26 may be actuated by means (not shown) which are conventional. While pit props 17 are secured against movement and pit props 25 and 26 retracted from securing engagement, pressure medium, such as hydraulic fluid, is fed to cylinder 20 via line 34 from a source (not shown). Since piston 21, although not fixedly mounted is, nevertheless, supported at the left end against retaining plate 22, cylinder 20 must be displaced to the right in transverse direction. The pressure medium on the left side of cylinder 20 is thus exhausted through line 35 in the conventional manner and if desired, the pressure medium may be returned to a pressure reservoir for further use. Due to the connection of strap 27 with cylinder 20, as cylinder 20 moves to the right, strap 27 and in turn mining frame member 23 will also be moved to the right. During this time, the end of strap 27 secured within slot 29 is passed from the left end of the slot to the right end as rollers 28 roll with a minimum of friction. Since the end of strap 27 is connected to piston 32 of cylinder 31, which is fixedly mounted on mining frame member 23, mining frame member 23 must move to the right.

Upon completing this transverse movement of mining frame member 23, pit props 25 and 26 may now be extended into engagement with the mining floor and ceiling and pit props 17 relaxed from engagement therewith. By passing pressure medium through line 35, from a source (not shown) piston 21 will be forced to the right so that pressure medium in the right side of cylinder 20 will be exhausted through line 34 in the aforedescribed manner. Since piston 21 is suitably maintained free from transverse movement with respect to slot plate 19 by means of retaining plates 22, the desired over-all transverse movement of the conveyor 11, base plate 16, and slot plate 19 will be effected toward the mine face 40. Thus, the related parts may be advanced in increments in a transverse direction parallel to one another as often as pressure medium is passed through line 34 or 35 as the case may be. Naturally, the reverse movement may be accomplished in the same way by merely reversing the order of feeding and exhausting the pressure medium while securing and relaxing the appropriate parts to be moved.

In order to execute the movement of the parts in longitudinal direction, pit props 17 may be relaxed while pit props 25 and 26 are maintained in securing position. Then, pressure fluid may be passed through line 36 to cylinder 31 whereby piston 32 will be moved in the direction of arrow 37 carrying along strap 27, cylinder 20, slot plate 19, base plate 16, and conveyor 11 due to the connective relation of the various parts. Upon completion of the forward displacement in longitudinal direction of conveyor 11 in this manner, pit props 17 may be secured against the mine ceiling and floor while pit props 25 and 26 are relaxed from securing position. Then, pressure medium may be passed through line 38 to the opposite end of cylinder 31 whereby mining frame member 23 will be moved in the direction of arrow 37 until cylinder 31 once more completely receives the extent of piston 32 therewithin. The passage of pressure medium to and from cylinder 31, via lines 36 and 38 may be carried out in the conventional manner by means (not shown) as described in connection with the operation of piston 21 and cylinder 20 using pressure medium lines 34 and 35.

In the same way, pit props 25 and 26 may again be secured against the mine ceiling and floor and accordingly pit props 17 released from engagement. The operation may be repeated in this manner in either forward or reverse direction to obtain the longitudinal displacement of conveyor 11 in the desired manner.

Thus, it will be appreciated that by providing slot plate 19 pivotally on base plate 16 and piston 21 swivelingly between retaining plates 22 by means of the point of connection between the surrounding cylinder 20 and the intermediate portion of strap 27, as well as the slot 29 arrangement including rollers 28, the apparatus of the invention may be readily adapted to the changing levels in mine tunnels being worked by the planing device.

What is claimed is:

1. Apparatus for displacing a longitudinal mining conveyor which comprises a first member having longitudinal displacing means and a second member having transverse displacing means, connecting means interconnecting said first member with said second member for longitudinally displacing said first and second members with respect to one another by said longitudinal displacing means and for transversely displacing said first and second members with respect to one another by said transverse displacing means, means for releasably securing each of said members from the displacement when the other member is to be displaced, said second member being adapted to be secured to a longitudinal mining conveyor for simultaneously displacing said conveyor as said second member is displaced, said transverse displacing means being mounted on said second member for vertical and horizontal movement with respect to said second member yet being secured against transverse and longitudinal movement with respect to said second member.

2. Apparatus according to claim 1 wherein said transverse displacing means includes a double acting piston mounted on a rod operably disposed within a cylinder, the ends of said rod extending through the corresponding ends of said cylinder, one of said rod and cylinder being fixedly mounted on said second member and the other being connected to said connecting means.

3. Apparatus according to claim 2 wherein said longitudinal displacing means includes coacting piston and cylinder means, one of said piston and cylinder means being mounted on said first member and the other being connected to said connecting means.

4. Apparatus according to claim 3 wherein said first member is secured from transverse movement with respect to said connecting means yet is mounted for longitudinal movement with respect to said connecting means, and said second member is secured from longitudinal movement with respect to said connecting means.

5. Apparatus according to claim 4 wherein said second member is adapted to be pivotally connected to one end of a longitudinal mining conveyor about a horizontal axis of pivot extending in transverse direction, and said first and second members are provided with pit props adjustable in height for abuttingly engaging an overhead and underlying support surface for securing said members against movement.

6. Apparatus according to claim 1 wherein said connecting means includes a flexible strap, said longitudinal displacing means includes a coacting longitudinal cylinder and piston means, one of said longitudinal cylinder and piston means being longitudinally connected to said first member and the other being connected to one end portion of said strap, said transverse displacing means includes a double acting transverse cylinder and piston, said piston being mounted on a rod, the ends of said rod extending through the corresponding ends of said transverse cylinder, said transverse cylinder being fixedly connected to the intermediate portion of said strap, said second member having a transverse slot defined therethrough, the other end of said strap being slidably secured via said slot to the said second member for movement transverse with respect to said second member along said slot, said second member having lateral retaining means, said ends of said rod being freely positioned between said retaining means for vertical and horizontal movement in longitudinal direction yet being retained from transverse movement with respect to said second member, said second member being pivotally connected to one end of a longitudinal mining conveyor about a transverse axis of pivot, said first member and at least one of said second member and said conveyor being provided with pit props adjustable in height for abuttingly engaging an overhead and underlying support surface for securing in turn said first member and at least one of said second member and said conveyor against movement during the displacement of one said member with respect to the other member.

References Cited in the file of this patent

UNITED STATES PATENTS 2,910,281     Wilkenloh _____ Oct. 27, 1959

OTHER REFERENCES

German printed application No. 1,039,975, July 30, 1957.